United States Patent [19]

Tamura et al.

[11] 4,296,844
[45] Oct. 27, 1981

[54] FLOATING CALIPER TYPE DISC BRAKE

[75] Inventors: Koichi Tamura, Tokyo; Tetsuo Haraikawa, Funabashi, both of Japan

[73] Assignee: Tokico Ltd., Japan

[21] Appl. No.: 74,807

[22] Filed: Sep. 11, 1979

[30] Foreign Application Priority Data

Sep. 20, 1978 [JP] Japan ............................ 53-129172

[51] Int. Cl.³ ................................................ F16D 65/04
[52] U.S. Cl. ................................ 188/73.38; 188/73.45
[58] Field of Search .................... 188/73.3, 73.4, 73.5, 188/73.6

[56] References Cited

U.S. PATENT DOCUMENTS

| | | | |
|---|---|---|---|
| 3,881,576 | 5/1973 | Haraikawa et al. | 188/73.5 |
| 3,915,263 | 10/1975 | Courbot | 188/735 X |
| 4,174,024 | 11/1979 | Hagiwara | 188/73.5 X |

Primary Examiner—Duane A. Reger
Attorney, Agent, or Firm—Wenderoth, Lind & Ponack

[57] ABSTRACT

A floating caliper type disc brake including a caliper being slidably supported on a stationary member, a resilient member interposed between a sliding portion of the caliper and the stationary member, the caliper having a bridge portion extending over a portion of the circumference of a disc and a pawl portion rigidly connected to the bridge portion for acting on one of friction pads, and a pad spring interposed between the bridge portion of the caliper and friction pads. The improvement comprises in that a projection is formed on backing plate of the one friction pad, and a retaining portion is formed in the pawl portion of the caliper for engaging with the projection of the friction pad thereby receiving the biasing force of the pad spring.

5 Claims, 6 Drawing Figures

FLOATING CALIPER TYPE DISC BRAKE

This invention relates to improvements in floating caliper type disc brakes which are used as braking means for use in motor-vehicles and ordinal industries. More particularly, the invention relates to improvements in floating caliper type disc brakes of the kind including a caliper being slidably supported at a sliding portion thereof on a stationary member through a resilient member which is interposed therebetween, an actuating mechanism provided in the caliper, a pad spring provided on the inner side of a bridge portion of the caliper for acting on a pair of friction pads, which are slidably supported on the stationary member, to bias them in the radially inward direction with respect to the axis of a disc.

The pad spring is effective to prevent chattering noise which would be generated by vibration of parts constituting the brake and to locate the friction pad at its proper position, further, to improve the assembling properties and to decrease the number of parts.

However, the point of application of the force of the pad spring on the caliper is spaced in the direction of the axis of the disc from the sliding portion, thus, there are shortcomings such that the caliper inclines with respect to the stationary member in the inactuated condition of the brake according to the force of the pad spring, and returns to its normal attitude wherein the sliding portion of which is parallel to a guiding or bearing surface of the stationary member in actuating the brake, thereby generating disturbances in the braking characteristics such as the dragging of the caliper, the increase in the actuating stroke of the actuating mechanism, the rupture of the resilient member or the like.

The present invention solves the shortcomings aforementioned in the prior art floating caliper type disc brakes by providing a novel disc brake wherein a projection is formed on a backing plate of one friction pad or an indirectly actuated friction pad which is actuated by a pawl portion of the caliper, and a retaining portion defining a recess is formed on the pawl portion of the caliper for engaging with and retaining the projection of the friction pad against the biassing force of the pad spring.

The specific features of the present invention will be apparent from a reading of the ensuing part of the specification in conjunction with the accompanying drawing, in which.

Figure 1:
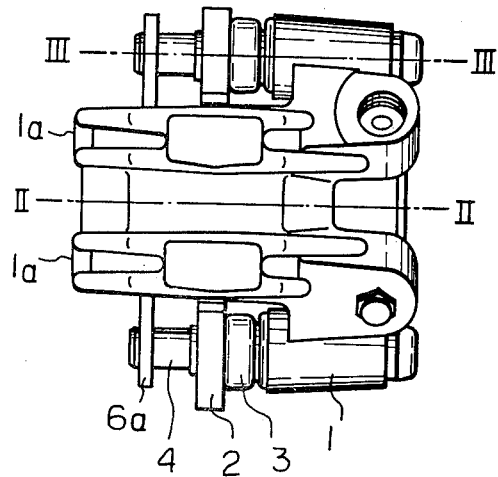
FIG. 1 is a plan view of prior art disc brake.
Figure 2:
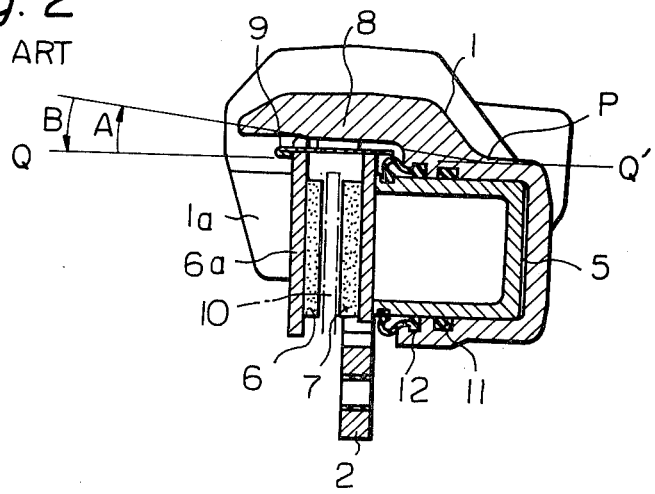
FIG. 2 is a sectional view taken along line II—II in FIG. 1.
Figure 3:
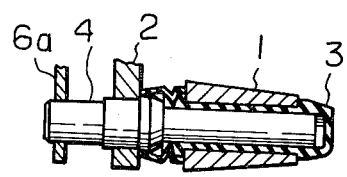
FIG. 3 is a sectional view taken along line III—III in FIG. 1.

A floating type disc brake according to prior art construction will firstly explained in conjunction with FIGS. 1 through 3.

Illustrated at 1 is a caliper, at 2 a stationary member rigidly having pins 4 which are slidably fitted in through bores formed in the caliper 1 through resilient members 3. Shown at 5 is a piston constituting an actuating mechanism, and a piston seal 11 and a piston boot 12 are provided on a sliding surface of the piston 5. Shown at 6 is a friction pad which is disposed on the side of a pawl portion 1a of the caliper 1, and a backing plate 6a is slidably fitting with the pins 4. Shown at 7 is another friction pad which is disposed on the side of the piston 5 of the caliper 1, and the circumference thereof is guided by the stationary member 2. The friction pads 6 and 7 are located by and biassed toward the center of rotation of the disc 10 by means of a pad spring 9 which is disposed on the inner side of a bridge portion 8 of the caliper 1.

The advantages of the floating caliper type disc brake having the construction aforementioned are such that it is possible to prevent chattering noise which would generate due to vibration of parts constituting the brake such as the stationary member 2, the caliper 1 and the friction pads 6 and 7 and that it is possible to facilitate assembly and to decrease the number of parts.

However, there are following shortcomings. Firstly, when the brake is not actuated, the bridge portion 8 of the caliper 1 receives, according to the biassing force of the pad spring 9, a pressing force in the arrow A direction (FIG. 2) which acts around the center P of sliding portions between the caliper 1 and the pins 4 acting as a fulcrum point. While, the caliper 1 and pins 4 are fitted through resilient members 3 at the sliding portions, thus, they can move relatively in the radial directions. Therefore, the caliper 1 inclines with respect to the datum line Q-Q' in the arrow A direction, by the pressing force, by an amount corresponding to the compression of the resilient member 3. Next, when the brake is actuated, the actuating force of the piston 5 presses the friction pads 6 and 7 toward the disc 10 and against the biassing force of the pad spring, thus, the caliper 1 which has been inclined in the inactuated condition moves in the arrow B direction and returns to align with the datum line Q-Q'. Therefore, the caliper 1 reciprocatingly moves in the arrow A and the arrow B directions.

As described heretofore, the pad spring 9 constitutes a source generating unusual movement of the caliper 1 such as inclinating or reciprocating movement or the like, and such unusual movement tends to generate disturbances in the braking characteristics such as the dragging of the caliper, the increase in the actuating stroke of the actuating mechanism, the rupture of the resilient members 3 in the sliding portions or the like.

The present invention provides a floating caliper type disc brake which solves the aforementioned problems caused of the pad spring without impairing advantages obtained therefrom by means of a simple constructional change.

An embodiment of the invention will hereinafter be explained with reference to FIGS. 4 and 5. Shown at 1b is a retaining portion formed in the pawl portion 1a of the caliper 1 with the shape of an arcuate hole the center line of which aligns with the center line of the piston 5 and the inner diameter of which being larger than the outer diameter of the piston by some amount. Shown at 6b is a projection formed by pushing out a portion of the backing plate 6a of the friction pad 6 by means of press work or the like and having an arcuate shape extending along the inner diameter of the retaining portion 1b.

In the aforesaid construction, the projection 6b of the friction pad 6 engages with the retaining portion 1b of the caliper 1 according to the biassing force of the pad spring 9, then, the biassing force of the pad spring 9 is divided into a pressing force acting on the bridge portion 8 in the caliper 1 and a downward pulling force acting on the retaining portion 1b. These forces act in the opposite directions, therefore, the biassing force of the pad spring 9 is dealt with as an internal stress of the caliper 1 and does not act on parts outside of the caliper 1 and, therefore, the caliper 1 does not incline.

Figure 4:
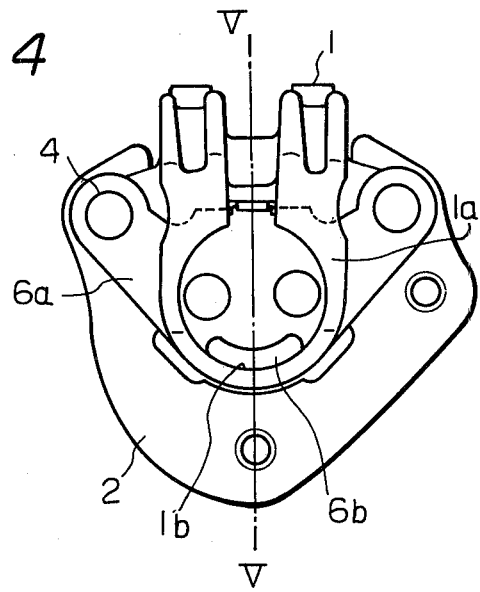
FIG. 4 is a front view of a floating caliper type disc brake according to the invention.
Figure 5:
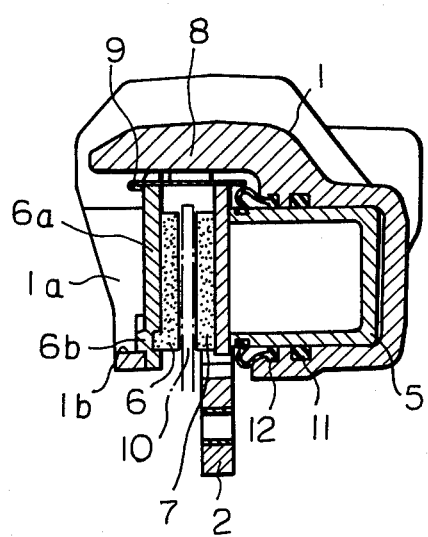
FIG. 5 is a sectional view taken along line V—V in FIG. 4.

In the construction of FIGS. 4 and 5, the construction and function of parts excluding the retaining portion 1b of the caliper 1 and the projection 6b of the friction pad 6 are similar to parts explained in conjuction with FIGS. 1 through 3 and, thus, detailed description therefor is omitted.

Figure 6:
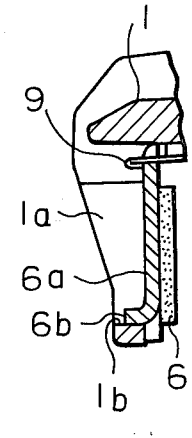
FIG. 6 is a sectional view showing a projection of the backing plate of a friction pad according to another embodiment of the invention.

FIG. 6 is a longitudinal sectional view showing another embodiment of the invention, wherein the projection 6b formed on the backing plate 6a of the friction pad 6 in the first embodiment is modified as being formed by bending, and the function of which is similar to the first embodiment.

As described heretofore, according to the floating caliper type disc brake of the invention, the unusual phenomenon such as the inclination, reciprocating movement or the like of the caliper can be prevented by a simple construction, thus, the following advantages can be obtained as compared with conventional floating caliper type disc brakes:

(1) It is possible to prevent uneven wear of friction pads owing to the dragging of the caliper and to prevent rupture of resilient members 3 in the sliding portions owing to the reciprocating inclining movement of the caliper, thus, it is possible to elongate the life of constituent parts, and to obtain stable braking characteristics over a long period of usage.

(2) It is possible to maintain a predetermined stroke of the actuating mechanism which has been increased by an amount corresponding to the reciprocating inclining movement of the caliper and, therefore, operating properties of the brake can be improved.

(3) The projection on the backing plate of the friction pad can be formed integrally with the backing plate, and the retaining portion for retaining the projection on the backing plate of the caliper can be formed directly on the pawl portion of the caliper, thus, the aforesaid advantages (1) and (2) can be attained without increasing the number of parts, the process and work in manufacturing parts, and work in assembling operations.

(4) It is possible to freely select the size and the shape of the retaining portion which is formed on the pawl portion of the caliper provided that the retaining portion can retain the projection on the backing plate of the friction pad, however, it is advantageous to arrange the retaining portion, as shown in the embodiments, on a line aligning with the piston with the inner diameter of which being somewhat larger than the outer diameter of the piston, whereby the retaining portion can be utilized as a guiding bore for guiding the piston in assembling the same into the cylinder.

Incidentally, in the detailed description of the invention it is described that the actuating mechanism in the caliper is a piston actuating type, however, needless to say, the function and effects similar to the piston actuating floating caliper type disc brake can be obtained from a floating caliper type disc brake having a mechanical actuating mechanism.

What is claimed is:

1. A floating caliper disc brake which comprises:
   a. a rotatable disc to be braked,
   b. a stationary member adapted to be secured to a non-rotatable structure carrying said disc,
   c. a caliper slidably mounted on said stationary member through a resilient member and said caliper having a bridge portion which bridges said disc in the direction of the rotational axis of said disc and a pawl portion which is substantially normal to said rotational axis.
   d. a brake actuating means providing within said caliper,
   e. first and second friction pads, respectively having first and second backing plates, said pads positioned on opposite sides of said disc,
   said first friction pad being adjacent to said stationary member and said second friction pad being adjacent to said pawl portion,
   said second backing plate having a projection on the back portion thereof,
   f. a stationary guide member attached to said stationary member and said second backing plate being suspended from said guide member and slidably guided thereon in the direction of the rotational axis of said disc,
   g. a pad spring provided beneath said bridge portion, said spring imparting a biasing force on said second backing plate in the radially inward direction with respect to the circumference of said disc and a reaction force on said bridge portion,
   h. a retaining member formed in said pawl portion of said caliper and being engaged by and retaining said projection, thereby countering the reaction force of said pad spring on said bridge portion.

2. The floating caliper disc brake of claim 1 wherein said brake actuating means includes a piston, said retaining portion being an arcuate hole in the pawl portion of the caliper, said projection having an arcuate shape complementary to said hole, the center line of said arc being aligned with the center line of said brake actuating means and the inner diameter of said arc being slightly larger than the outer diameter of said piston.

3. The floating caliper disc brake of claim 1 wherein said stationary guide member is a pair of pins extending from said stationary member in the direction of the rotational axis of said disc.

4. The floating caliper disc brake of claim 3 wherein said stationary member is substantially in the shape of a plate disposed in the normal direction with respect to the rotational axis of said disc.

5. The floating caliper disc brake of claim 4 wherein said stationary member includes guiding means for said first friction pad.

* * * * *